United States Patent
Zama et al.

(10) Patent No.: US 6,623,556 B2
(45) Date of Patent: Sep. 23, 2003

(54) NEAR-INFRARED TRANSMITTING BLACK AZO PIGMENTS

(75) Inventors: Yoshiyuki Zama, Tokyo (JP); Hisao Okamoto, Tokyo (JP); Hiromitsu Yanagimoto, Tokyo (JP); Shirou Yamamiya, Tokyo (JP); Yoshio Abe, Tokyo (JP); Michiei Nakamura, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/025,751

(22) Filed: Dec. 26, 2001

(65) Prior Publication Data

US 2002/0121228 A1 Sep. 5, 2002

(30) Foreign Application Priority Data

Dec. 26, 2000 (JP) .......................... 2000-395585
Mar. 22, 2001 (JP) .......................... 2001-082005

(51) Int. Cl.[7] ............... C09B 29/09; C09B 67/20
(52) U.S. Cl. .............. 106/496; 106/410; 106/413; 106/493; 106/494; 106/495; 252/587
(58) Field of Search .................. 106/493, 494, 106/495, 496, 410, 413; 252/587

(56) References Cited

U.S. PATENT DOCUMENTS

| 4,869,532 A | 9/1989 | Abe et al. .............. 283/88 |
| 6,521,038 B2 | 2/2003 | Yanagimoto et al. ....... 106/493 |

FOREIGN PATENT DOCUMENTS

| EP | 211 272 | * | 2/1987 |
| JP | 63-186770 | * | 8/1988 |
| JP | 63-190009 | * | 8/1988 |
| JP | 01-170601 | * | 7/1989 |
| JP | 11-236514 | * | 8/1999 |

* cited by examiner

Primary Examiner—Anthony J. Green
(74) Attorney, Agent, or Firm—Oblon, Spivak, McClelland, Maier & Neustadt, P.C.

(57) ABSTRACT

Near-infrared transmitting black azo pigments are represented by the following formula (1) and have a crystalline form selected from the group consisting of a thin, long crystalline form and a leaf-shaped crystalline form:

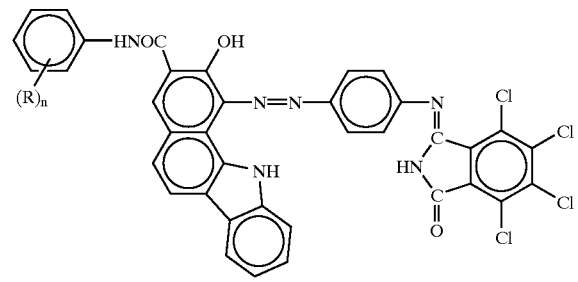

(1)

wherein R represents at least one group selected from the group consisting of lower alkyl groups having 1 to 3 carbon atoms and lower alkoxy groups having 1 to 3 carbon atoms, n stands for an integer of from 1 to 5, and, when n is other than 1, Rs may be the same or different. These near-infrared transmitting black azo pigments can be produced by treating the corresponding black azo pigments of the formula (1) with an alkali in an alcohol. Near-infrared transmitting black azo pigments compositions each comprises one or more of the near-infrared transmitting black azo pigments and a near-infrared transmitting material as a vehicle.

8 Claims, 6 Drawing Sheets

| 2θ (°) | D (Å) | I (counts) | I/I₀ |
|---|---|---|---|
| 5.30 | 16.660 | 363 | 42 |
| 6.65 | 13.281 | 266 | 31 |
| 9.00 | 9.818 | 302 | 35 |
| 10.60 | 8.339 | 575 | 67 |
| 12.15 | 7.278 | 281 | 33 |
| 13.35 | 6.627 | 861 | 100 |
| 14.10 | 6.276 | 231 | 27 |
| 17.65 | 5.021 | 321 | 37 |
| 23.50 | 3.783 | 409 | 48 |
| 24.40 | 3.645 | 493 | 57 |
| 26.30 | 3.386 | 736 | 85 |
| 26.85 | 3.318 | 765 | 89 |
| 32.20 | 2.778 | 221 | 26 |

| 2θ (°) | D (Å) | I (counts) | I/I$_0$ |
|---|---|---|---|
| 5.65 | 15.629 | 254 | 9 |
| 8.45 | 10.455 | 281 | 10 |
| 9.70 | 9.111 | 633 | 23 |
| 11.40 | 7.756 | 243 | 9 |
| 17.10 | 5.181 | 352 | 13 |
| 18.05 | 4.910 | 648 | 24 |
| 20.20 | 4.392 | 199 | 7 |
| 25.00 | 3.559 | 339 | 13 |
| 26.30 | 3.386 | 2711 | 100 |

| 2θ (°) | D (Å) | I (counts) | I/I₀ |
|---|---|---|---|
| 5.35 | 16.505 | 404 | 37 |
| 8.20 | 10.774 | 278 | 25 |
| 9.25 | 9.553 | 392 | 36 |
| 10.80 | 8.185 | 424 | 39 |
| 12.30 | 7.190 | 298 | 27 |
| 13.85 | 6.389 | 923 | 84 |
| 17.20 | 5.151 | 278 | 25 |
| 18.15 | 4.884 | 352 | 32 |
| 23.50 | 3.783 | 430 | 39 |
| 24.20 | 3.675 | 630 | 57 |
| 25.35 | 3.511 | 512 | 47 |
| 26.95 | 3.306 | 1101 | 100 |
| 32.35 | 2.765 | 256 | 23 |

| 2θ (°) | D (Å) | I (counts) | I/I$_0$ |
|---|---|---|---|
| 9.30 | 9.502 | 277 | 62 |
| 13.75 | 6.435 | 297 | 67 |
| 25.50 | 3.490 | 445 | 100 |

NEAR-INFRARED TRANSMITTING BLACK AZO PIGMENTS

BACKGROUND OF THE INVENTION

1. Field of the Invention

This invention relates to near-infrared transmitting black azo pigments and black azo pigment compositions containing the same. The term "near-infrared" as used herein means light of 800 to 2,000 nm in wavelength.

2. Description of the Related Art

Carbon black, aniline black, iron oxide black and the like have been used as black pigments for many years. These pigments absorb light of wavelengths from the ultraviolet range to the far-infrared range, have no transmitting property for near-infrared light, and have a tendency to absorb infrared rays, i.e., heat waves. Materials colored by these pigments, therefore, tend to become hot by direct sunlight. When these conventional black pigments are used as colorants in paints for electronic parts, they are poor in electrical insulating property.

In recent years, on the other hand, black pigments having properties not available from black pigments commonly used to date, such as carbon black and aniline black, are required in an increasing number of fields owing to developments of lasers, especially semiconductor lasers and sensors therefor. Examples of such fields can include fields making use of such black pigments as colorants—such as paints for electronic parts, temperature rise preventing paints for automobiles or construction materials, and cheese cloths for agricultural use—in addition to infrared communications, optical filters and illegal copying preventing prints, all of which make use of black pigments.

Carbon black, aniline black and the like are accompanied by drawbacks in that they are poor in electrical insulating property and are not suited for the coloration of electrical parts and the like, although they absorb light of wavelengths from the ultraviolet range to the far-infrared range and have conventionally been used as black pigments in various coloring applications. These properties are inherent to such pigments themselves and cannot be improved. There is, accordingly, an outstanding demand for a black pigment free of such drawbacks, namely, having high transmittance for near-infrared rays.

SUMMARY OF THE INVENTION

An object of the present invention is, therefore, to provide a black pigment, which can transmit near-infrared rays at high transmittance and can also be used for coloring electrical parts and the like. Another object of the present invention is to provide a pigment composition making use of the black pigment as a colorant.

The present inventors have proceeded with an extensive investigation to achieve the above-described objects. As a result, it has been found that the transmittance of near-infrared rays is increased by changing the crystalline form of a specific black azo pigment into a thin, long crystalline form or a leaf-shaped crystalline form, leading to the completion of the present invention. The above-described objects of the present invention can be achieved by the present invention which will be described hereinafter. Described specifically, the present invention provides a near-infrared transmitting black azo pigment represented by the following formula (1) and having a crystalline form selected from the group consisting of a thin, long crystalline form and a leaf-shaped crystalline form.

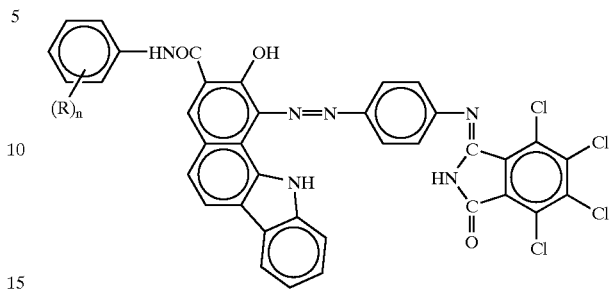

(1)

wherein R represents at least one group selected from the group consisting of lower alkyl groups having 1 to 3 carbon atoms and lower alkoxy groups having 1 to 3 carbon atoms, n stands for an integer of from 1 to 5, and, when n is other than 1, Rs may be the same or different. The present invention also provides a near-infrared transmitting black azo pigment composition, which comprises the above-described near-infrared transmitting black azo pigment and a near-infrared transmitting material as a vehicle.

The near-infrared transmitting black azo pigment according to the present invention is low in near-infrared ray reflectance and high in near-infrared ray transmittance, different from the known black azo pigment having the same chemical structure (the near-infrared ray reflectance and near-infrared ray transmittance of which are high and low, respectively).

The near-infrared transmitting black azo pigment according to the present invention are useful as a colorant in temperature rise preventing paints for automobiles, construction materials and the like, paints for agricultural cheese cloths and paints for electronic parts, and also as a colorant or the like in infrared communications and optical filters and also for the prevention or illegal copying.

DETAILED DESCRIPTION OF THE INVENTION AND PREFERRED EMBODIMENTS

Figure 1:
FIG. 1 is a transmission electron micrograph of a near-infrared transmitting black azo pigment of Example 1, in which the scale indicates 1 μm.

The present invention will next be described more specifically based on certain preferred embodiments. The near-infrared transmitting black azo pigment according to the present invention is characterized in that it is a black azo pigment represented by the above-described formula (1), its crystalline form is either a thin, long crystalline form or a leaf-shaped crystalline form, and permits transmission of near-infrared rays at high transmittance.

The black azo pigment represented by the formula (1) is known by itself (see JP4-15265B), has a thick, long crystalline form, and in an X-ray diffraction pattern thereof, shows a maximum diffraction peak around a diffraction angle (2θ) of 26°. Further, the pigment of this crystalline form is high in near-infrared ray reflectance but low in near-infrared ray transmittance.

The near-infrared transmitting black azo pigment of the present invention, which has a thin, long crystalline form, on the other hand, has no strong diffraction peak around the diffraction angle (2θ) of 26° but shows strong diffraction peaks at diffraction angles (2θ) between 13° and 14° and around 27° in its X-ray diffraction pattern. Further, the near-infrared transmitting black azo pigment of the present invention, which has a leaf-shaped crystalline form, has no strong diffraction peak around the diffraction angle (2θ) of 26° but shows a somewhat: broad diffraction peak over diffraction angles (2θ) between 20° and 30°. These near-infrared transmitting black azo pigments are both low in near-infrared reflectance but high in near-infrared transmittance, so that they are different in crystalline form and behavior to near-infrared rays from the above-described known black azo pigment.

The near-infrared transmitting black azo pigment of the present invention, which has the leaf-shaped crystalline form, is in the form of thin, plate-shaped crystals each of which is about 0.5 to 1 μm in major axis, about 0.3 to 0.6 μm in minor axis, 1.2 or greater in aspect ratio (major axis/minor axis), and not greater than ¹/₁₀ of the major axis, specifically about 0.06 μm or so in thickness. For this crystalline form, it has high transmittance for near-infrared rays.

The above-described, known black azo pigment is obtained using a diazo component and a single type of coupling component neither too much nor too less upon synthesis of the pigment. On the other hand, the near-infrared transmitting black azo pigment according to the present invention, which has the thin, long crystalline form and has characteristic properties as described above, can be obtained, for example, by using, upon synthesis of the pigment, a diazo component and a coupling component such that one of the components becomes too much or too little relative to the other, or by coupling plural types of coupling agents at the same time.

On the other hand, the near-infrared transmitting black azo pigment according to the present invention, which has the leaf-shaped crystalline form, can be obtained by treating the black azo pigment of the formula (1) with an alcohol solution of an alkali. This leaf-shaped crystalline form is considered to be obtained, because by the treatment, a hydroxyl group of benzocarbazole in the coupling component for the pigment forms a salt under the action of the alkali so that the pigment is formed through a partially-dissolved state.

The near-infrared transmitting black azo pigment according to the present invention is produced by diazotizing a diazo component of the below-described formula (2) and coupling the resultant diazonium salt to a coupling component of the below-described formula (3). The diazotization of the diazo component represented by the below-described formula (2) can be conducted by following a conventionally-known diazotization process for aromatic amines. For example, the diazotization can be carried out by adding a solution of sodium nitrite to a chilled aqueous solution of a mineral salt of the diazo component such as its hydrochloride.

As the coupling component, a 2-hydroxy-11H-benzo[a]-carbazole-3-carboxyphenylamide represented by the below-described formula (3) is used. Specific examples of the coupling component can include 2-hydroxy-N-(2'-methyl-4'-methoxyphenyl)-11H-benzo[a]-carbazole-3-carboxamide, 2-hydroxy-N-(4'-methoxyphenyl)-11H-benzo[a]-carbazole-3-carboxamide, and 2-hydroxy-N-(2'-ethylphenyl)-11H-benzo[a]-carbazole-3-carboxamide.

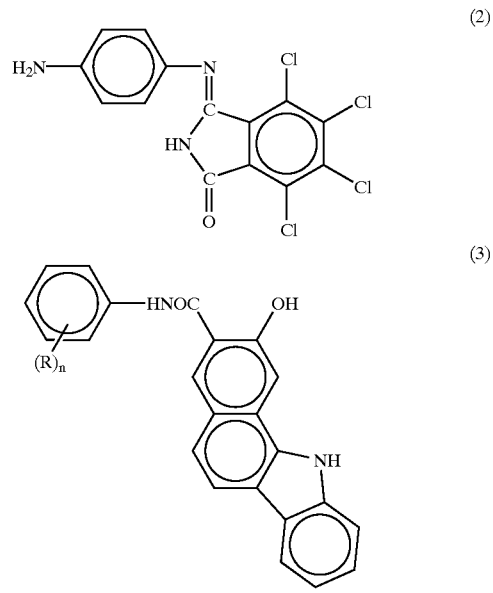

wherein R and n have the same meanings as defined above.

The near-infrared transmitting black azo pigment of the formula (1) is obtained by coupling the diazonium salt of the above-described diazo component and the above-described coupling component in an aqueous medium or an organic solvent medium such as o-dichlorobenzene in a manner known per se in the art. Upon conducting the coupling, a single type of diazo component and a single type of coupling component can be selected and used. As an alternative, two or more types of coupling components can be used in combination.

The above-described, known black azo pigment is obtained by using the diazonium salt of the diazo component and a single type of coupling component at a molar ratio of 1:1 upon conducting the coupling reaction. On the other hand, the near-infrared transmitting black azo pigment according to the present invention, which is in the thin, long crystalline form, is obtained by using the coupling component at a molar ratio smaller or greater than 1:1 relative to the diazo component upon conducting the coupling reaction or by using, in combination, two or more coupling components having different substituent groups.

Whichever coupling procedure is used, the near-infrared transmitting black azo pigment according to the present invention can be obtained, for example, by conducting the coupling in o-dichlorobenzene and then heating the reaction product at 170° C. for 4 hours to subject it to crystallization treatment. The above-described known black azo pigment presents a thick, long crystalline form with crystals of varied sizes mixed together, and in its diffraction pattern, shows a strong diffraction peak around a diffraction angle (2θ) of 26°. On the other hand, the near-infrared transmitting black azo pigment according to the present invention, which is in the thin, long crystalline form, presents a thin, long crystalline form containing crystals of rather uniform size, and in its X-ray diffraction pattern, shows strong diffraction peaks at diffraction angles (2θ) between 13° and 14° and around 27°. The near-infrared transmitting black azo pigment according to the present invention is in a crystalline form consisting of thin, long crystals of about 0.5 to 1 μm in length and about 0.03 μm in width. Its average aspect ratio (length/width) is at least. 10.

Examples of the alkali, which is used in the alkali treatment in the production of the near-infrared transmitting black azo pigment according to the present invention in the leaf-shaped crystalline form, can include sodium hydroxide and potassium hydroxide, with sodium hydroxide being preferred. No particular limitation is imposed on the alcohol insofar as it can dissolve the above-described alkali, although methyl alcohol is preferred. The alkali treatment is conducted, for example, by finely suspending the black azo pigment, which has been separated from the reaction medium subsequent to the coupling reaction, in an dried or non-dried form in the alcohol, adding about 3 to 30 wt. %, based on the black azo pigment, of the alkali directly to the suspension, and dissolving the alkali or by dissolving the alkali in a form dissolved beforehand in the alcohol and then stirring the resultant mixture at 5 to 50° C. for about 0.5 to 5 hours. After the treatment, the reaction product is filtered, washed with water and then dried to obtain the near-infrared transmitting black azo pigment according to the present invention in the leaf-shaped crystalline form. By the alkaline alcohol treatment, the crystalline form of the pigment changes from a thick, long crystalline form, in which crystals of varied sizes are mixed, into a leaf-shaped crystalline form, so that the transmittance of the pigment for near-infrared rays becomes higher than that of the conventionally-known pigment in the thick, long crystalline form.

It has been found that the black azo pigment according to the present invention is provided with an improved transmittance for near-infrared rays owing to the change of its crystalline form from the thick, long crystalline form to the thin, long crystalline form or the leaf-shaped form. Owing to this improvement in transmittance, the light quantity of a near-infrared laser—which reaches at a laser receiver through a material having a paint film with the pigment according to the present invention contained therein—increases when the laser is irradiated onto the material. Accordingly, even if the sensitivity of the receiver itself is low, the laser beam can be detected with high sensitivity even if the sensitivity of the receiver itself is low. This can obviate electrical control such as amplification and/or S/N ratio adjustment, so that electrical control elements can be made smaller.

In some instances, an illegal-copying-preventing print may be obtained, for example, by printing the same black characters or patterns, which cannot be discriminated by naked eye, with a black ink, which is colored with carbon black, and another black ink, which is colored with a black pigment other than carbon black, in combination. In this case, the determination of non-genuiness of a print which appears to have been illegally copied may be effected by irradiating infrared rays and measuring its reflectance. A print is determined to be genuine if there is a difference in the reflectance of infrared rays between the area printed with the black ink colored with carbon black and the area printed with the black ink colored with the black pigment other than carbon black (although they cannot be discriminated by naked eye). On the other hand, no difference is observed in the reflectance of infrared rays in the case of an illegal copy or print made with only a black ink colored with carbon black. In this manner, the prevention of illegal copying of prints can be assured.

In such a print as described above, an area printed with an ink colored with the near-infrared transmitting black azo pigment according to the present invention having high infrared ray transmittance, when irradiated by infrared rays, allows the infrared rays to transmit through the ink layer, and the infrared rays are reflected by a backing (generally, a white paper sheet or the like), are allowed to transmit back through the ink layer, and are then detected by an infrared ray receiver. An ink making use of the near-infrared transmitting black azo pigment according to the present invention, the infrared ray transmittance of which is high, is therefore useful as an illegal copying preventing ink.

When a black paint making use of the near-infrared transmitting black azo pigment according to the present invention as a colorant is applied to an exterior wall or a roof of a building or the like to form a paint film, near-infrared rays in sunlight are allowed to transmit through the paint film, are reflected by a white backing, are allowed to transmit back through the paint film, and are then dissipated to the outside. The black paint can, therefore, be used as a heat shielding paint for reducing a temperature increase in a room of a building or the like.

The near-infrared transmitting black azo pigment composition according to the present invention is a pigment composition, which contains the above-described near-infrared transmitting black azo pigment according to the present invention and an infrared transmitting material as a vehicle. The pigment composition is used for the production of various paints, printing inks, recording materials and the like. To the pigment composition according to the present invention, a chromatic color, white pigment, a black pigment other than the above-mentioned near-infrared transmitting black azo pigment, an extender pigment or the like can be added to an extent not impairing the advantageous effects of the present invention in order to act as a complementary color for the near-infrared transmitting black azo pigment according to the present invention.

Illustrative colors usable as chromatic colors can include conventionally-known chromatic pigments and chromatic dyes, from which one or more colors can be suitably selected and used. Specific examples can include organic pigments such as azo pigments, anthraquinone pigments, phthalocyanine pigments, quinacridone pigments, perylene pigments, azomethine pigments, and pyrrole pigments.

Illustrative of the near-infrared transmitting material employed as a vehicle in the pigment composition according to the present invention are vehicles which have conventionally been used in the production of paints, printing inks and the like. These vehicles are all usable insofar as they have been used conventionally in the above-described applications, and no particular limitation is imposed thereon. Examples of vehicle resins usable in printing inks can include natural resins or petroleum resins such as drying oil, rosin and gilsonite, phenol resins, alkyd resins, vinyl resins, polyamide resins, acrylic resins, and nitrocellulose.

Examples of vehicle resins usable in paints can include the above-exemplified natural resins, alkyl resins, amino resins, epoxy resins, unsaturated polyester resins, vinyl resins, acrylic resins, and polyurethane resins. They are used in the form of solutions in solvents or aqueous media. Like the ratios of the various pigments to the vehicles in the above-described individual applications, no particular limitation is imposed on the ratio of such a transparent vehicle and the near-infrared transmitting black azo pigment according to the present invention.

The present invention will next be described specifically based on Examples and Comparative Examples, in which designations of "part or parts" and "%" are each on a weight basis.

EXAMPLE 1

The compound of the above-described formula (2) (3.75 parts, 0.01 mol) was suspended in glacial acetic acid (11.3 parts). Concentrated hydrochloric acid (3.7 parts) was added to the suspension, followed by stirring. Water (2.6 parts) was added to the resulting solution. While maintaining the temperature of the thus-obtained mixture at 0 to 5° C., a 40% aqueous solution of sodium nitrite (2.0 parts) was added further, followed by stirring at the same temperature for about 30 minutes to obtain a yellow solution of a diazonium salt. To the solution, sodium acetate trihydrate (4.8 parts) was added to prepare a solution of the diazonium salt.

On the side, a compound of the formula (3) in which the phenyl group having the substituent group(s) R was 2'-methyl-4'-methoxyphenyl (3.56 parts, 0.009 mol) was suspended in o-dichlorobenzene (250 parts). To the suspension so obtained, the above-described solution of the diazonium salt was added at 20 to 30° C., followed by the addition of glacial acetic acid (20 parts) while maintaining the temperature at 30 to 40° C. The reaction mixture was maintained at the same temperature for 5 to 6 hours to conduct coupling. After that, the reaction mixture was heated at 170° C. for 4 hours to perform crystallization treatment. Next, filtration, washing with methanol, washing with water, drying and grinding were conducted to afford a black azo pigment according to the present invention.

Figure 5:
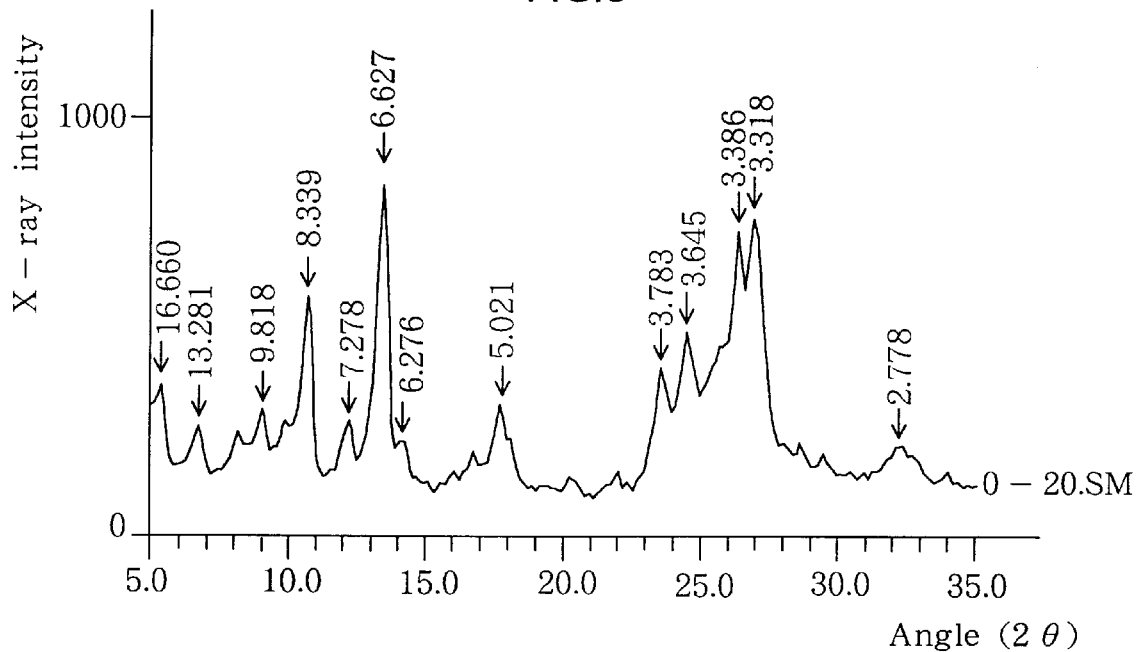
FIG. 5 is an X-ray diffraction pattern of the near-infrared transmitting black azo pigment of Example 1.

The black azo pigment was in a thin, long crystalline form as shown in the ×30,000 transmission electron micrograph of FIG. 1. As a result of its X-ray diffraction, strong diffraction peaks were shown at diffraction angles (2θ) of 13.35° and 26.85° (FIG. 5) The average aspect ratio of the crystals was 15.

Comparative Example 1

Figure 2:
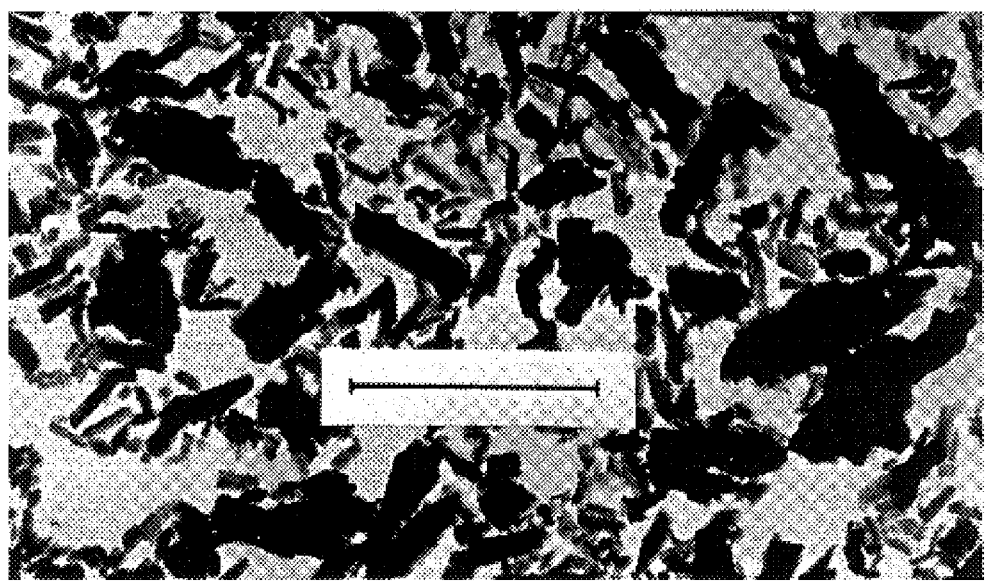
FIG. 2 is a transmission electron micrograph of a black azo pigment of Comparative Example 1, in which the scale indicates 1 μm.
Figure 6:
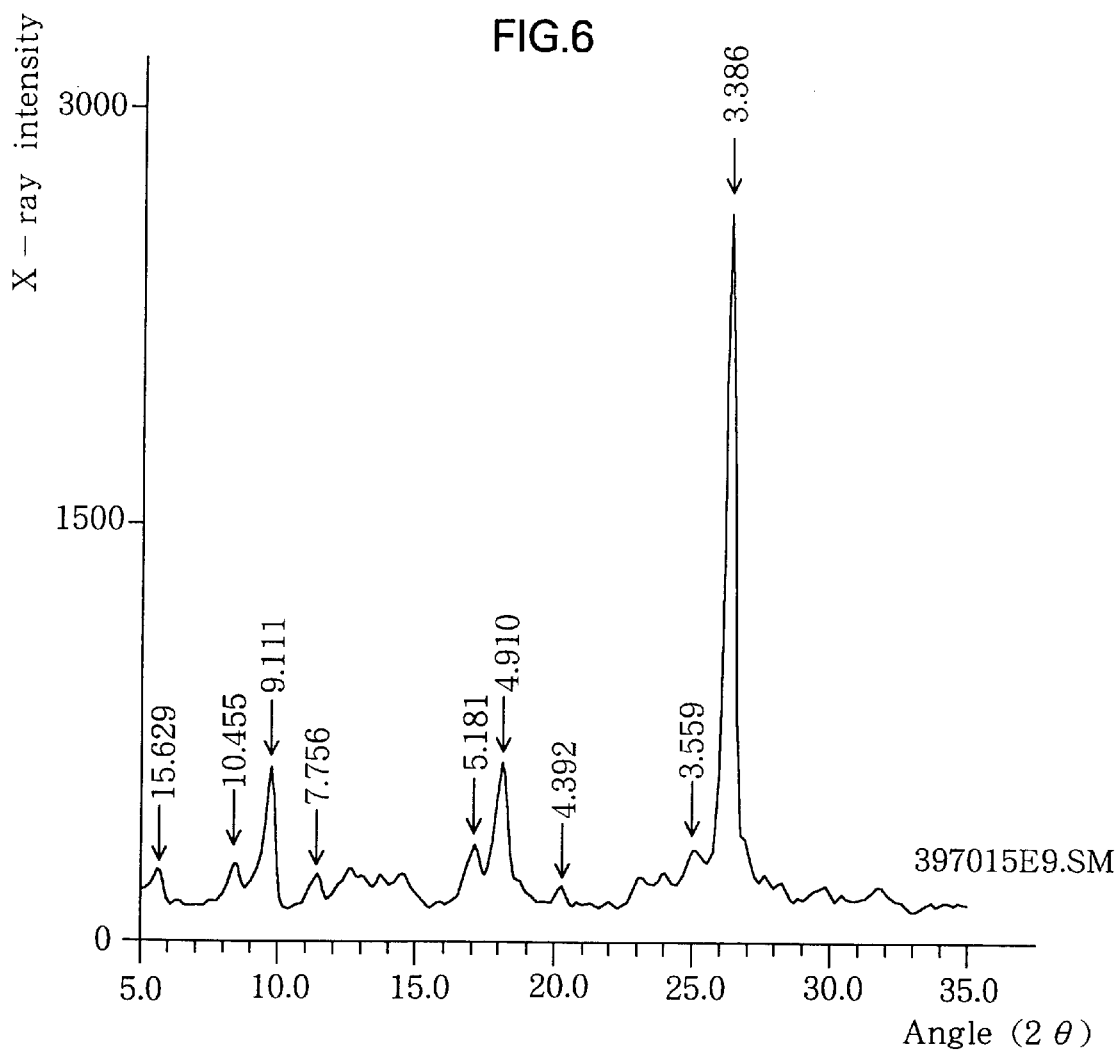
FIG. 6 is an X-ray diffraction pattern of the black azo pigment of Comparative Example 1.

A black azo pigment was obtained as a comparative example in a similar manner as in Example 1 except that the amount of the compound of the formula (3) in which the phenyl group having the substituent group R was 2'-methyl-4'-methoxyphenyl was changed to 3.96 parts (0.01 mole). The black azo pigment was in the form of thick, long crystals shown in the ×30,000 transmission electron micrograph of FIG. 2. As a result of X-ray diffraction, a strong peak appeared at a diffraction angle (2θ) of 26.30° (FIG. 6). The average aspect ratio of the crystals was 5.

EXAMPLE 2

The compound of the above-described formula (2) (3.75 parts, 0.01 mol) was suspended in glacial acetic acid (11.3 parts). Concentrated hydrochloric acid (3.7 parts) was added to the suspension, followed by stirring. Water (2.6 parts) was added to the resulting solution. While maintaining the temperature of the thus-obtained mixture at 0 to 5° C., a 40% aqueous solution of sodium nitrite (2.0 parts) was added further, followed by stirring at the same temperature for about 30 minutes to obtain a yellow solution of a diazonium salt. To the solution, sodium acetate trihydrate (4.8 parts) was added to prepare a solution of the diazonium salt.

On the side, a compound of the formula (3) in which the phenyl group having the substituent group(s) R was 2'-methyl-4'-methoxyphenyl (2.77 parts, 0.007 mol) and a compound of the formula (3) in which the phenyl group having the substituent group(s) R was 4'-methoxyphenyl (1.53 parts, 0.004 mole) were suspended in o-dichlorobenzene (250 parts). To the suspension so obtained, the above-described solution of the diazonium salt was added at 20 to 30° C., followed by the addition of glacial acetic acid (20 parts) while maintaining the temperature at 30 to 40° C. The reaction mixture was maintained at the same temperature for 5 to 6 hours to conduct coupling. After that, the reaction mixture was heated at 170° C. for 4 hours to perform crystallization treatment. Next, filtration, washing with methanol, washing with water, drying and grinding were conducted to afford a black azo pigment according to the present invention.

Figure 3:
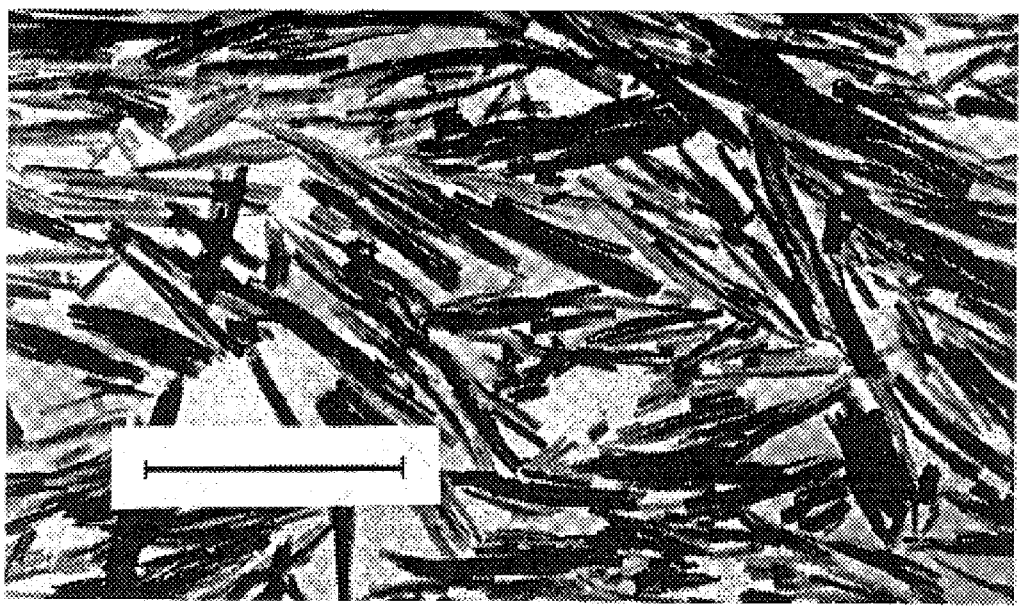
FIG. 3 is a transmission electron micrograph of a near-infrared transmitting black azo pigment of Example 2, in which the scale indicates 1 μm.
Figure 7:
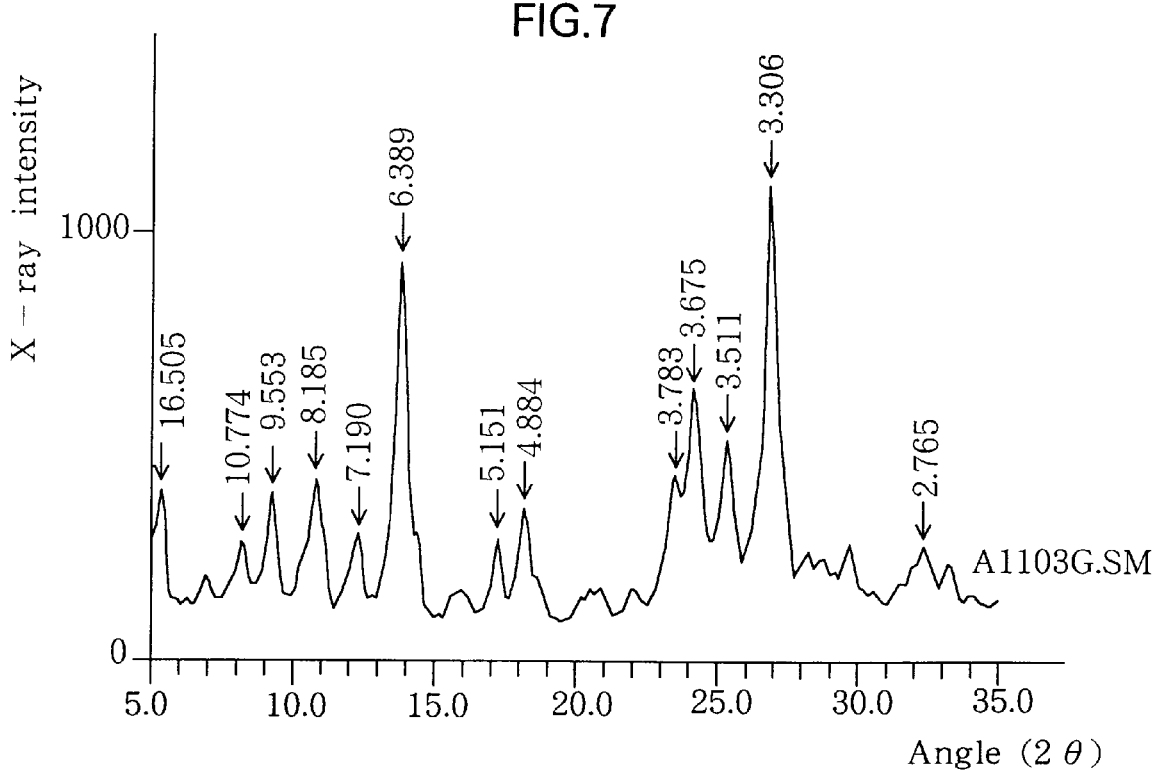
FIG. 7 is an X-ray diffraction pattern of the near-infrared transmitting black azo pigment of Example 2.

The black azo pigment was in a thin, long crystalline form as shown in the ×30,000 transmission electron micrograph of FIG. 3. As a result of its X-ray diffraction, strong diffraction peaks were shown at diffraction angles (2θ) of 13.85° and 26.95° (FIG. 7). The average aspect ratio of the crystals was 20.

Application Example 1

The black azo pigments of Examples 1 and 2 and Comparative Example 1 were used separately. In accordance with the below-described formulation, they were separately mixed with the remaining components. In a manner known per se in the art, glass beads were added to the respective mixtures, followed by the dispersion of the respective black azo pigments on a paint shaker to prepare three black paints. The paint making use of the pigment of Example 1 will be designated as "Paint 1", the paint making use of the pigment of Example 2 will be called "Paint 2", and the paint making use of the pigment of Comparative Example 1 will be referred to as "Paint 3". Those paints were coated onto quartz glass plates by a 2 mil applicator, respectively, and were then dried in a manner known per se in the art to obtain black paint films. The near-infrared (wavelength: 700 to 1,200 nm) transmittances of those black paint films were measured by "Model 330 Automatic Spectrophotometer" (trade name; manufactured by Hitachi, Ltd.). The results shown in Table 1 were obtained.

<Formulation>

| | |
|---|---|
| Black azo pigment (one of the black azo pigments of Examples 1 and 2 and Comparative Example 1) | 5 parts |
| Alkyd resin ("PHTHALKYD 133-60", trade name; product of Hitachi Chemical Company, Ltd.) | 60 parts |
| Melamine resin ("SUPERBECKAMINE J820", trade name; product of Dainippon Ink & Chemicals, Inc.) | 25 parts |
| Hydrocarbon solvent | 10 parts |
| Total | 100 parts |

TABLE 1

| Wavelength | Transmittance (%) | | |
|---|---|---|---|
| (nm) | Paint 1 | Paint 2 | Paint 3 |
| 700 | 25 | 18 | 18 |
| 800 | 72 | 70 | 54 |
| 900 | 78 | 77 | 62 |
| 1000 | 81 | 81 | 67 |
| 1100 | 84 | 84 | 71 |
| 1200 | 85 | 86 | 74 |

From the results shown above in Table 1, it is appreciated that the near-infrared transmitting black azo pigments according to the present invention show high transmittance to near-infrared rays.

Using the above-described painted glass plates, their near-infrared (wavelength: 700 to 1,200 nm) transmittances were next measured with a white backing (a plate coated with magnesium oxide) and a black backing (plate coated with carbon black), respectively, by "Model 330 Automatic Spectro-photometer" (trade name; manufactured by Hitachi, Ltd.) The results are shown in Table 2. Incidentally, the term "white backing reflectance" is a total value of a reflectance from a surface of a paint film and a reflectance from a surface of a white backing after transmission through the paint film, and the term "black backing resistance" is a reflectance only from a surface of a paint film.

TABLE 2

| Wavelength | White backing reflectance (%) | | | Black backing reflectance (%) | | |
|---|---|---|---|---|---|---|
| (nm) | Paint 1 | Paint 2 | Paint 3 | Paint 1 | Paint 2 | Paint 3 |
| 700 | 5 | 6 | 8 | 2 | 3 | 5 |
| 800 | 65 | 62 | 58 | 11 | 10 | 18 |
| 900 | 74 | 73 | 64 | 7 | 6 | 13 |
| 1000 | 76 | 77 | 66 | 6 | 4 | 10 |
| 1100 | 79 | 80 | 68 | 5 | 3 | 8 |
| 1200 | 80 | 82 | 69 | 4 | 3 | 7 |

From the results shown above in Table 2, it is appreciated that the near-infrared transmitting black azo pigments according to the present invention show high transmittance to near-infrared rays and have low infrared ray reflectance.

Comparative Example 2

In a similar manner as in Application Example 1, Black Paint 4 was prepared using carbon black.

Application Example 2

Using bar coater No. 40, Paints 1, 3 and 4 were applied to aluminum sheets (150 mm×70 mm×0.1 mm), respectively. They were dried in a manner known per se in the art to form three Black Painted Sheets 1, 3 and 4. Those three Black Painted Sheets 1, 3 and 4 were placed on temperature rise test boxes made of expanded polystyrene, respectively. Each test sheet was exposed to light from a 250 W infrared lamp held at a distance of 400 mm above the test sheet, and the temperature on the surface of the test sheet and that in the box were measured 1 minute, 5 minutes, 10 minutes, 20 minutes and 30 minutes later. The test results are shown in Table 3. Painted Sheet 1 obtained using Paint 1, which contained the pigment according to the present invention, was higher in the transmittance of infrared rays than Painted sheets 3 and 4, and therefore, resulted in greater reflection from the backing aluminum sheet. Compared with Painted Sheets 3 and 4, Painted Sheet 1 was therefore lower in both test sheet surface temperature and intra-box temperature, and had higher heat shielding property.

TABLE 3

| | Temperature, ° C. (surface/intra-box) | | | | |
|---|---|---|---|---|---|
| | 1 min later | 5 min later | 10 min later | 20 min later | 30 min later |
| Painted Sheet 1 | 37/22 | 44/27 | 47/33 | 49/39 | 49/41 |
| Painted Sheet 2 | 39/24 | 47/29 | 49/35 | 51/41 | 53/44 |
| Painted Sheet 3 | 58/27 | 70/33 | 74/43 | 77/54 | 78/57 |

Application Example 3

In accordance with the following formulation, Offset Lithographic Black Ink 1 was prepared.

| Black azo pigment obtained in Example 1 | 30.0 parts |
|---|---|
| Oil varnish for offset lithographic inks | 61.7 parts |
| Drier | 0.8 part |
| Ink solvent | 7.5 parts |
| Total | 100.0 parts |

In the above-described formulation, the oil varnish for offset lithographic inks contained, as primary components, a rosin-modified phenol resin, a drying-oil-modified isophthalic acid alkyd and a drying oil, and was added with added with an ink solvent and an aluminum chelate.

In accordance with the following formulation, Offset Lithographic Black Ink 2 was prepared.

| Furnace-type carbon black | 23.0 parts |
|---|---|
| Oil varnish for offset lithographic inks | 71.2 parts |
| Drier | 0.8 part |
| Ink solvent | 5.0 parts |
| Total | 100.0 parts |

Using Inks 1 and 2 obtained above, sheets of art paper were printed solid, respectively, at a screen tint of 100% with 150 screen ruling by an offset press to obtain Black Printed Paper Sheets 1 and 2.

Printed Paper Sheets 1 and 2 had the same black color to the naked eye. When photographed on infrared films, however, Printed Paper Sheet 1 was substantially white while Printed Paper Sheet 2 was black. As is understood from this, Printed Paper Sheets 1 and 2 were both looked black under visible light, but on infrared films, they are photographed in clearly different colors, that is, in a white color and a black color, respectively. Making use of this characteristic property, the pigments according to the present invention are useful as pigments for illegal copying preventing inks.

EXAMPLE 3

The black azo pigment of Comparative Example 1 was dispersed in methanol (80 parts), followed by the addition of a solution (16 parts) of caustic soda (0.8 part) in methanol.

Figure 4:
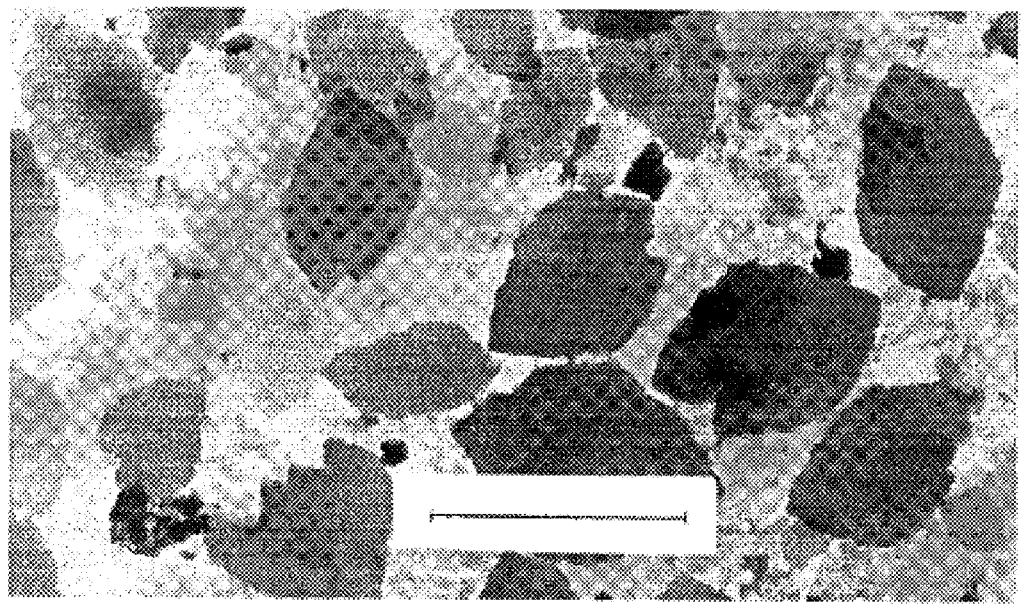
FIG. 4 is a transmission electron micrograph of a near-infrared transmitting black azo pigment of Example 3, in which the scale indicates 1 μm.
Figure 8:
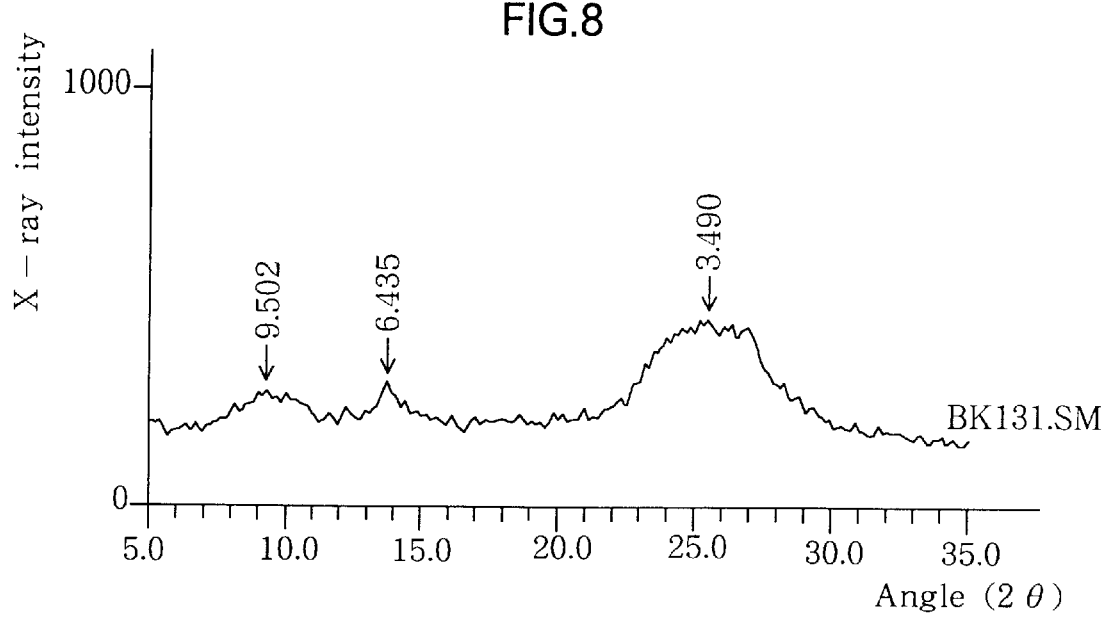
FIG. 8 is an X-ray diffraction pattern of the near-infrared transmitting black azo pigment of Example 3.

The resulting mixture was stirred at 25° C. for 1 hour, and then filtered. The solid was collected by filtration, washed with water, dried and ground to obtain a near-infrared transmitting black azo pigment according to the present invention. The crystalline form of the pigment was observed on its ×30,000 transmission electron micrograph. As is shown in FIG. 4, it was leaf-shaped. Further, an X-ray diffraction pattern of the pigment is shown in FIG. 8. In the diffraction pattern, the diffraction peak around the diffraction angle (2θ) of 26° disappeared, but a somewhat broad diffraction peak appeared between 20° and 30°. The average major axis of the pigment was 0.8 μm, and its average minor axis was 0.5 μm. Its average thickness as obtained from a scanning electron micrograph was 0.06 μm.

Application Example 4

In a similar manner as in Application Example 1 except that the paint film thickness was set at 10 mil, paints were prepared using the near-infrared transmitting black pigment of Example 3 and the black azo pigment of Comparative Example 1, respectively. The paint making use of the pigment of Example 3 will be designated as "Paint 5", while the paint making use of the pigment of Comparative Example 1 will be referred to as "Paint 6". In a similar manner as in Application Example 1, the transmittances of the respective paint films were measured by "Model 330 Automatic Spectrophotometer" (trade name; manufactured by Hitachi, Ltd.). The results are shown in Table 4.

TABLE 4

| Wavelength | Transmittance (%) | |
|---|---|---|
| (nm) | Paint 5 | Paint 6 |
| 700 | 0 | 0 |
| 800 | 22 | 16 |
| 900 | 34 | 26 |
| 1000 | 40 | 31 |
| 1100 | 45 | 34 |
| 1200 | 49 | 37 |

In Table 4, Paint 6 is the same as Paint 3 in Table 1.

From Table 4, it is appreciated that the paint film colored by the near-infrared transmitting black azo pigment according to the present invention was much higher in near-infrared ray transmittance than the paint film colored by the known pigment (Comparative Example 1) which was the same in structure as the pigment of the present invention but was different in crystalline form from the pigment of the present invention.

Application Example 5

Temperature changes were investigated in a similar manner as in Application Example 2 except for the use of Paints 5, 6 and 4. The test results are shown in Table 5. Painted Sheet 5 obtained using Paint 5, which contained the pigment according to the present invention, was higher in the transmittance of infrared rays than Painted sheets 6 and 4, and therefore, resulted in greater reflection from the backing aluminum sheet. Compared with Painted Sheets 6 and 4, Painted Sheet 5 was therefore lower in both test sheet surface temperature and intra-box temperature, and had higher heat shielding property.

TABLE 5

| | Temperature, ° C. (surface/intra-box) | | | | |
|---|---|---|---|---|---|
| | 1 min later | 5 min later | 10 min later | 20 min later | 30 min later |
| Painted Sheet 5 | 36/20 | 43/25 | 47/31 | 49/38 | 49/40 |
| Painted Sheet 6 | 39/24 | 47/29 | 49/35 | 51/41 | 53/44 |
| Painted Sheet 4 | 58/27 | 70/33 | 74/43 | 77/54 | 78/57 |

Note)
Painted Sheet 4 was the same as Painted Sheet 4 in Table 3.

Application Example 6

In a similar manner as in Application Example 3, Printed Paper sheet 3 and Printed Paper sheet 2 (same as Printed Paper Sheet 2 in Application Example 3) were obtained using Ink 3 making use of the pigment of Example 3 and Ink 2 of Application Example 3, respectively. Printed Paper Sheets 3 and 2 had the same black color to the naked eye. When photographed on infrared films, however, Printed Paper Sheet 3 was substantially white while Printed Paper Sheet 2 was black. As is understood from this, Printed Paper Sheets 3 and 2 were both looked black under visible light, but on infrared films, they are photographed in clearly different colors, that is, in a white color and a black color, respectively. Making use of this characteristic property, the pigments according to the present invention are useful as pigments for the prevention of illegal copying.

What is claimed is:

1. A near-infrared transmitting black azo pigment represented by the following formula (1) and having a crystalline form selected from the group consisting of a thin, long crystalline form and a leaf-shaped crystalline form:

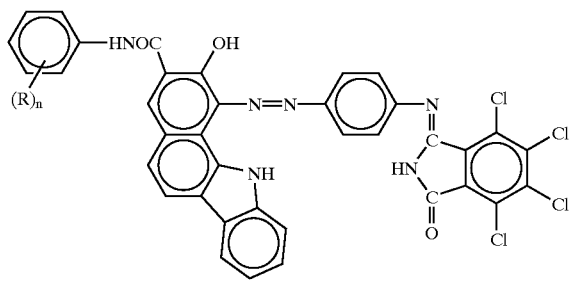

(1)

wherein R represents at least one group selected from the group consisting of lower alkyl groups having 1 to 3 carbon atoms and lower alkoxy groups having 1 to 3 carbon atoms, n stands for an integer of from 1 to 5, and, when n is other than 1, each R may be the same or different.

2. A near-infrared transmitting black azo pigment according to claim 1, which is in a form of thin, long crystals and in an X-ray diffraction pattern thereof, shows strong diffraction peaks at diffraction angles (2θ) between 13° and 14° and around 27°.

3. A near-infrared transmitting black azo pigment according to claim 1, which is in a form of leaf-shaped crystals and in an X-ray diffraction pattern thereof, shows a broad diffraction peak over diffraction angles (2θ) between 20° and 30°.

4. A near-infrared transmitting black azo pigment according to claim 1, which is in a form of thin, long crystals having an average aspect ratio of at least 10.

5. A near-infrared transmitting black azo pigment according to claim 1, which is in a form of leaf-shaped crystals having an average aspect ratio of at least 1.2 and a thickness not greater than 1/10 of a major axis thereof.

6. A process for the production of a near-infrared transmitting black azo pigment in a form of leaf-shaped crystals as defined in claim 1, which comprises treating a black azo pigment of the formula (1) with an alkali in an alcohol.

7. A near-infrared transmitting black azo pigment composition comprising a near-infrared transmitting black azo pigment as defined in any one of claims 1–5 and a near-infrared transmitting material as a vehicle.

8. A near-infrared transmitting black azo pigment composition according to claim 7, further comprising at least one pigment selected from the group consisting of chromatic pigments, white pigments, black pigments other than said black azo pigment, and extender pigments.

* * * * *